United States Patent
Amidei

(10) Patent No.: US 10,205,981 B2
(45) Date of Patent: *Feb. 12, 2019

(54) PLAYBACK SYNCHRONIZATION ACROSS PLAYBACK DEVICES

(71) Applicant: DIVX, LLC, San Diego, CA (US)

(72) Inventor: William David Amidei, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/234,768

(22) Filed: Aug. 11, 2016

(65) Prior Publication Data

US 2016/0353143 A1 Dec. 1, 2016

Related U.S. Application Data

(63) Continuation of application No. 14/814,247, filed on Jul. 30, 2015, now Pat. No. 9,432,718, which is a
(Continued)

(51) Int. Cl.
*H04N 21/242* (2011.01)
*H04N 21/2387* (2011.01)
(Continued)

(52) U.S. Cl.
CPC ....... *H04N 21/242* (2013.01); *H04N 21/2387* (2013.01); *H04N 21/26208* (2013.01);
(Continued)

(58) Field of Classification Search
CPC .............. H04N 21/43; H04N 21/4302; H04N 21/4305; H04N 21/8547; H04N 21/242; H04N 21/4307
See application file for complete search history.

(56) References Cited

U.S. PATENT DOCUMENTS

| 7,246,367 | B2 * | 7/2007 | Iivonen | H04N 7/165 |
| | | | | 348/E7.063 |
| 7,627,808 | B2 | 12/2009 | Blank et al. | |

(Continued)

FOREIGN PATENT DOCUMENTS

| CN | 102782669 A | 11/2012 |
| CN | 105247437 B | 1/2018 |

(Continued)

OTHER PUBLICATIONS

International Preliminary Report on Patentability for International Application PCT/US2014/040308, Report issued Dec. 1, 2015, dated Dec. 10, 2015, 08 Pgs.
(Continued)

*Primary Examiner* — Benjamin R Bruckart
*Assistant Examiner* — Akshay Doshi
(74) *Attorney, Agent, or Firm* — KPPB LLP

(57) ABSTRACT

Systems and methods for synchronizing the playback of streamed content on multiple playback devices is disclosed. The systems and methods include receiving time information based on a network time source in the playback devices connected to a defined network. The playback clock in each playback device is set based upon the time information. A first playback device then generates presentation time information including a start time for playback and broadcast the presentation time information to the other playback device over the defined network. The playback devices use the presentation time information to adjust the presentation time stamps of the frames of the media content in the stream.

22 Claims, 6 Drawing Sheets

Related U.S. Application Data continuation of application No. 13/907,791, filed on May 31, 2013, now Pat. No. 9,100,687.

(51) Int. Cl.
  *H04N 21/6332* (2011.01)
  *H04N 21/8547* (2011.01)
  *H04N 21/43* (2011.01)
  *H04N 21/262* (2011.01)

(52) U.S. Cl.
  CPC ......... *H04N 21/43* (2013.01); *H04N 21/4302* (2013.01); *H04N 21/4305* (2013.01); *H04N 21/6332* (2013.01); *H04N 21/8547* (2013.01)

(56) References Cited

U.S. PATENT DOCUMENTS

| | | | |
|---|---|---|---|
| 7,996,700 B2 | 8/2011 | Celinski et al. | |
| 9,100,687 B2 | 8/2015 | Amidei | |
| 9,380,099 B2 | 6/2016 | Amidei et al. | |
| 9,432,718 B2 | 8/2016 | Amidei | |
| 9,648,362 B2 | 5/2017 | Amidei et al. | |
| 10,063,896 B2 | 8/2018 | Amidei et al. | |
| 2006/0002681 A1 | 1/2006 | Spilo | |
| 2007/0110074 A1 | 5/2007 | Bradley et al. | |
| 2007/0250761 A1 | 10/2007 | Bradley et al. | |
| 2008/0177822 A1* | 7/2008 | Yoneda | H04L 12/282 709/202 |
| 2008/0270800 A1 | 10/2008 | Krober | |
| 2009/0129752 A1 | 5/2009 | Yamada et al. | |
| 2010/0100917 A1 | 4/2010 | Chiao | |
| 2010/0111491 A1 | 5/2010 | Kamoto | |
| 2011/0047247 A1 | 2/2011 | Katz | |
| 2011/0110360 A1* | 5/2011 | Fenwick | G06F 1/14 370/350 |
| 2011/0218656 A1* | 9/2011 | Bishop | G06F 17/30017 700/94 |
| 2011/0276648 A1 | 11/2011 | Soldan | |
| 2012/0144435 A1 | 6/2012 | Spilo et al. | |
| 2013/0067116 A1* | 3/2013 | Ostergren | H04L 65/4069 709/248 |
| 2013/0128116 A1 | 5/2013 | Knowles | |
| 2014/0237086 A1 | 8/2014 | Legallais | |
| 2014/0359075 A1 | 12/2014 | Amidei et al. | |
| 2014/0359681 A1 | 12/2014 | Amidei | |
| 2015/0341683 A1 | 11/2015 | Amidei et al. | |
| 2016/0309206 A1 | 10/2016 | Amidei et al. | |
| 2017/0238027 A1 | 8/2017 | Amidei et al. | |

FOREIGN PATENT DOCUMENTS

| | | | |
|---|---|---|---|
| CN | 108092973 A | 5/2018 | |
| EP | 2290899 A2 | 3/2011 | |
| JP | 2001091680 A | 4/2001 | |
| JP | 2003085068 A | 3/2003 | |
| JP | 2006101364 A | 4/2006 | |
| JP | 2008252422 A | 10/2008 | |
| JP | 2011223060 A | 11/2011 | |
| TW | 201246873 A | 11/2012 | |
| WO | 2012021747 A1 | 2/2012 | |
| WO | 2013045456 A1 | 4/2013 | |
| WO | 2014194232 A1 | 12/2014 | |
| WO | 2014194236 A2 | 12/2014 | |
| WO | 2014194236 A3 | 5/2015 | |

OTHER PUBLICATIONS

International Search Report and Written Opinion for International Application PCT/US2014/040308, Report Completed Sep. 10, 2014, dated Mar. 27, 2015, 9 pgs.

"MPEG-2, Part 1, ISO/IEC 13818-1", Information technology—Generic Coding of Moving Pictures and Associated Audio: Systems, Nov. 13, 1994, 161 pgs.

"MPEG-4, Part 14, ISO/IEC 14496-14", Information technology—Coding of audio-visual objects, Nov. 15, 2003, 18 pgs.

Fielding et al., "Hypertext Transfer Protocol—HTTP1.1", Network Working Group, RFC 2616, Jun. 1999, 114 pgs.

Schulzrinne, H. et al., "Real Time Streaming Protocol (RTSP)", Internet Engineering Task Force, RFC 2326, Apr. 1998, 80 pgs.

Extended European Search Report for European Application No. 14805026.3, Search completed Dec. 20, 2016, dated Jan. 3, 2017, 9 Pgs.

International Preliminary Report on Patentability for International Application PCTUS2014040299, dated Dec. 1, 2015, dated Dec. 10, 2015, 6 Pgs.

International Search Report and Written Opinion for International Application PCTUS2014040299, report completed Sep. 8, 2014, dated Oct 6, 2014, 7 Pgs.

* cited by examiner

PLAYBACK SYNCHRONIZATION ACROSS PLAYBACK DEVICES

CROSS-REFERENCE TO RELATED APPLICATION

The present invention is a continuation of U.S. application Ser. No. 14/814,247, entitled "Playback Synchronization across Playback Devices," filed Jul. 30, 2015, which application is a continuation of U.S. application Ser. No. 13/907,791 entitled "Playback Synchronization across Playback Devices," filed May 31, 2013, the disclosures of which are incorporated by reference herein their entirety.

FIELD OF THE INVENTION

This invention relates to the playback of streamed media content by multiple playback devices. More particularly, this invention relates to synchronizing the playback of media content by multiple playback devices connected to a local network.

BACKGROUND OF THE INVENTION

The term streaming media describes the playback of media on a playback device, where the media is stored on a server and continuously sent to the playback device over a network during playback. For purposes of this discussion, media and/or encoded media are defined as data of a work that includes video, audio, pictures, or another type of presentation that may be displayed, played or in some other way presented by a playback device. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

Adaptive bitrate streaming performs adequately for playback of media content on a single device. However, streaming of content presents a problem when trying to synchronize the playback of content on multiple devices. The lack of synchronization may be a problem when one or more devices are performing the playback within close proximity of one another as the lack of synchronization may be noticeable by viewers. For example, two or more playback devices may be set up in a restaurant to view a live sporting event. If the playback is not synchronized, the user may notice the broadcast delay between devices. In the past, the synchronization is performed by a user can manually controlling the start and stop of the playback on each of the devices to synchronize the playback. Thus, this is often time consuming and can still lead to minor delays between the playbacks on the devices. Thus, those skilled in the art are constantly striving to provide systems and process for efficiently synchronizing the playback of streamed content on multiple devices.

SUMMARY OF THE INVENTION

Systems and methods for synchronizing the playback of streamed content on multiple playback devices in accordance with embodiments of this invention are disclosed. In accordance with embodiments of this invention, a method for playback of encoded media performed by a playback device to synchronize playback of the content with other playback device may be performed by the following actions. A playback device transmits a request for time information to a network time provider and receives the time information from the network time provider in response. The time information is then used by the playback device to set a playback clock in the playback device. The playback device also receives presentation time information for a stream of encoded media from another playback device over a defined network. The presentation time information includes a stream start time. A stream of the encoded media is then received by the playback device. The playback device then adjusts the presentation time information of each of the plurality of frames of the stream in the playback device based upon the playback information.

In accordance with some embodiments, the playback device determines whether the presentation time information has been received in response to beginning the reception of the stream of encoded content. If the presentation time information has not been received from another device, the playback device generates presentation time information and broadcasts the presentation time information to other playback devices connected to a network over the local network.

In accordance with some of these embodiments, the playback device determines the presentation time information for the of frames of the streamed content in response to a determination that the presentation time information has not been received and commences playback of the streamed content based on the play time information. In accordance with some other of these embodiments, the playback device determines whether a specified time period has expired. If the time period has expired, the playback device generates updated presentation time information in response to the time period expiring and broadcasts the updated presentation time information to the other playback devices connected to the defined network over the defined network.

In accordance with some embodiments of this invention, the playback device receives updated presentation time information from another playback device over the defined network. The presentation time information of each of the frames of the stream is adjusted by the playback device based upon the playback information. In accordance with some of these embodiments, the playback device determines whether the updated presentation time information is received within a specified time period. If the updated playback information is not received in the specified time period, the playback device generates updated presentation time information and broadcasts the updated presentation time information to the other playback devices connected to the defined network over the defined network. In accordance with some of these embodiments, the updated presentation time information includes presentation time information for a frame in the stream and a current playback speed.

In accordance with some embodiments of this invention the time information is provided in Coordinated Universal Time. In accordance with some embodiments of this invention, the start time is provided in Coordinated Universal Time.

In accordance with some embodiments of this invention, the network time provider is a Network Time Protocol Server and the transmitting of the request and receiving of the time information are performed using Network Time Protocol. In accordance with some other embodiments, the network time provider is a local time server for the defined network. In accordance with some of these embodiments, the local time server transmits a request for time information to a Network Time Protocol server and receives the time information from the Network Time Protocol server. The local time server then receives the request for time information from the playback device, generates the time information for the playback device from the timing information received from the Network Time Protocol server, and transmits the time information to the playback device.

In accordance with some embodiments of this invention, the presentation time information includes presentation time information includes presentation time information for a particular frame and a playback speed. In accordance with some embodiments, the defined network is a local area network.

DETAILED DISCLOSURE OF THE INVENTION

Turning now to the drawings, systems and methods for synchronizing playback of streamed content by multiple clients is provided. In particular, the playback devices being synchronized are connected to the same local network in accordance with embodiments of this invention. The playback devices can use time information from a common source to set the playback clocks in the individual playback devices. The first playback device to start playback of the streamed content can then broadcast playback time information to the other playback devices over the local network. In several embodiments, the playback time information indicates the time for the start of playback. The playback time information can be generated using the time information from the playback clock of the first playback device. In several embodiments, each device then adjusts the presentation time information of the frames in the received stream content based on the received playback time information. The first device may then periodically broadcast updates of the presentation time information that the other devices may use to adjust the presentation time information of the frames. If the other playback devices do not receive updated presentation time information in a particular period of time, one of the other devices may then start transmitting playback information.

Streaming System Architecture

Figure 1:
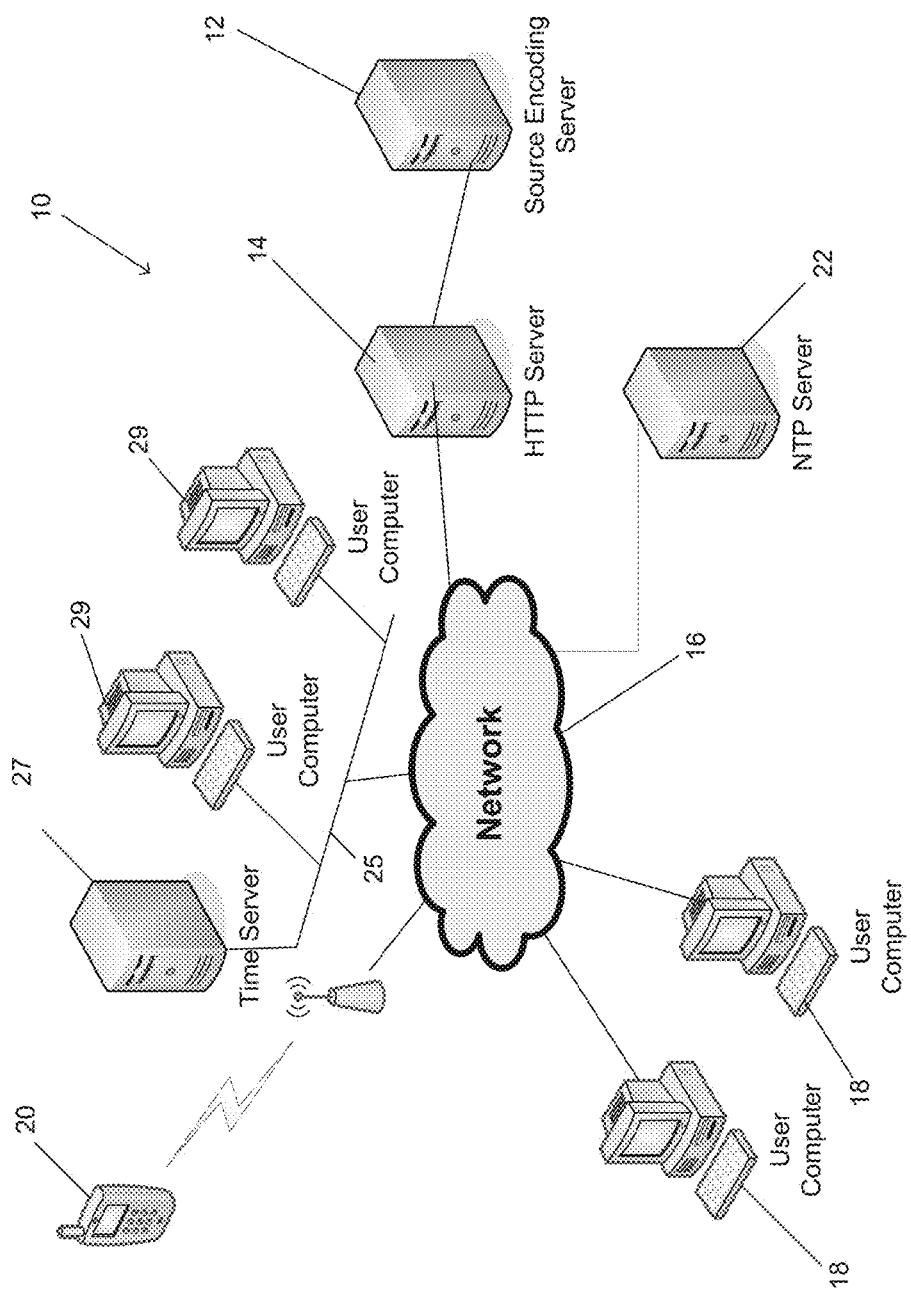
FIG. 1 illustrates a network diagram of a media streaming system in accordance with an embodiment of the invention.

Turning now to the FIG. 1, an adaptive streaming system in accordance with an embodiment of the invention is illustrated. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). Typically, the source encoding server 12 generates a top level index to a plurality of container files containing the streams, at least a plurality of which are alternative streams. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

Time server 22 is a server that provides Coordinated Universal Time (UTC) or equivalent information. In the shown embodiment, the time server 22 is a Network Time Protocol (NTP) server or an equivalent system that may be maintained by a third party. The use of NTP allows the time server 22 to provide time information to the devices to allow internal clocks in the individual devices that are set using the time information to be synchronized within tens (10s) of milliseconds (ms) of one another.

In the illustrated embodiment, playback devices include personal computers 18, CE players, and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1, any of a variety of architectures including systems that perform conventional streaming and not adaptive bitrate streaming can be utilized that enable playback devices to request portions of the top level index file and the container files in accordance with embodiments of the invention.

As illustrated, playback devices, such as user computers 29, providing systems and methods in accordance with embodiments of this invention are connected to the network 16 via a Local Area Network (LAN) 25. The LAN 25 can include a local time server 27. Local time server 27 receives time information from the NTP server 22 and generates local time information based upon the time information received from the NTP server 22. Although shown as a server, one skilled in the art will recognize that any device connected to LAN 25 that can provide time information may be used without departing from embodiments of this invention. The local time information of local time server 27 may be provided to the playback devices connected to the LAN 25 to provide time information that includes less latency than time information obtained from device connected via a larger network, such as the Internet to allow better synchronization of the playback clocks in the device connected to the local. The use of local time server 27 connected to the LAN 25 may be used when a synchronization of an order that is less than 10 s of ms is desired. Network time servers, playback devices, and local time servers in accordance with embodiments of the invention are discussed further below.

Playback Device

Figure 2:
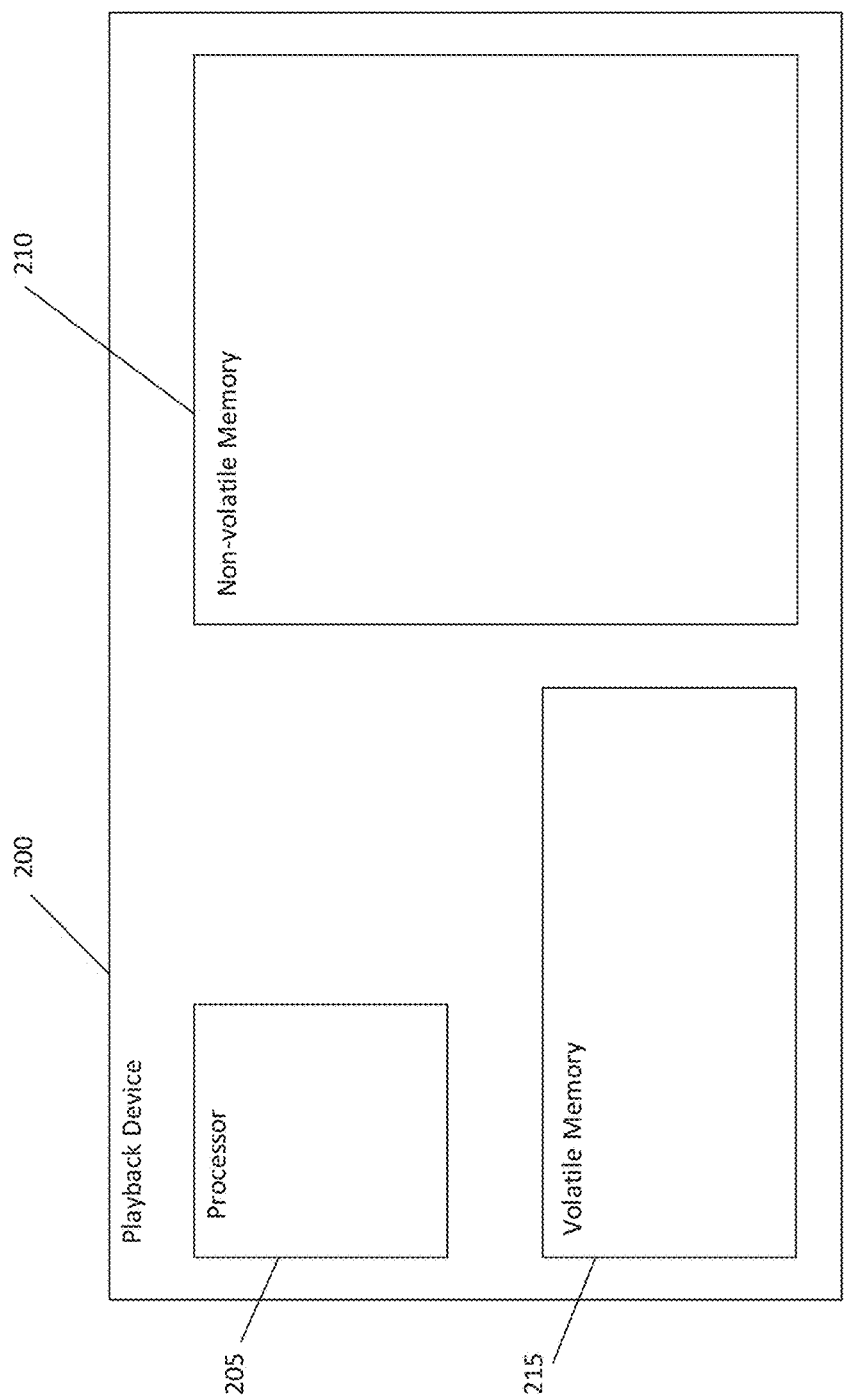
FIG. 2 illustrates a block diagram of components of a playback device that performs processes for providing systems and methods in accordance with an embodiment of this invention.

Some processes for providing methods and systems in accordance with embodiments of this invention are executed by a playback device. The relevant components in a playback device that can perform the processes in accordance with an embodiment of the invention are shown in FIG. 2. One skilled in the art will recognize that the illustrated playback device may include other components that are omitted for brevity without departing from this invention. The playback device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the playback device 200 to perform processes including processes in accordance with embodiments of the invention and/or data for the processes being utilized. In other embodiments, the playback device software and/or firmware can be stored in any of a variety of non-transitory computer readable media appropriate to a specific application.

Playback Synchronization

In accordance with embodiments of this invention, playback devices connected to the same local network obtain time information from a common source and use the time information to set the playback clock of the devices. The playback devices also receive presentation time information from the first playback device to begin streaming the content. The presentation time information is then used to adjust the presentation time of frames of the stream in the remaining playback devices based upon the playback clock and the received presentation time information. Since the playback clocks have been set based upon time information from a common source there should by less than 10 s of ms delay between the presentations. In order to further reduce the latency between the playback devices connected to the local network, a time source connected to the local network may be used to obtain the time information needed to set the playback clocks. A timing diagram of messages and information passed between devices over a network in accordance some embodiments of this invention is illustrated in FIG. 3.

Figure 3:
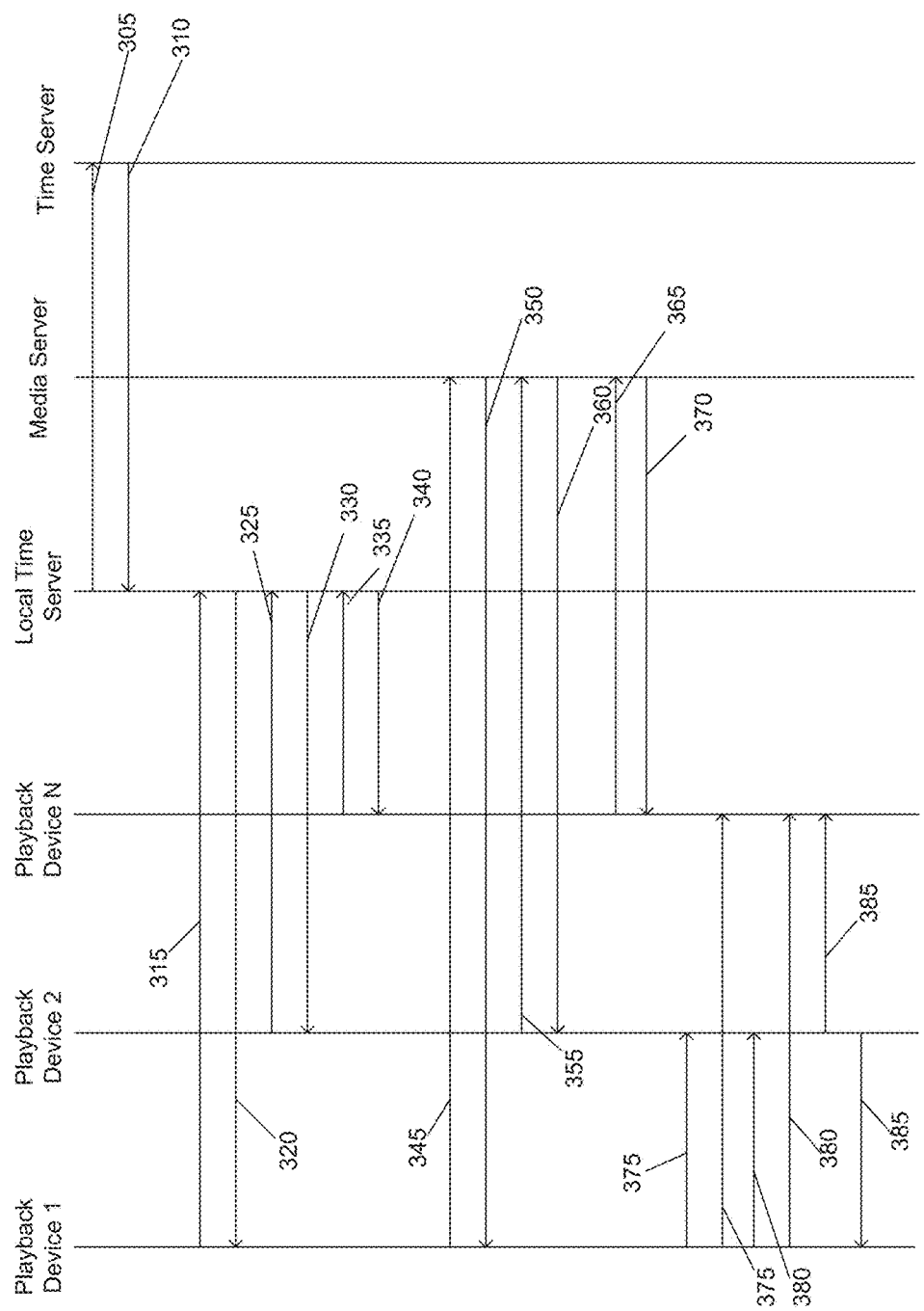
FIG. 3 illustrates a timing diagram of information transmitted between devices over a network to provide synchronization of playback in accordance with some embodiments of this invention.

The system in FIG. 3 includes N playback devices connected to a defined network, such as, a local area network; a local time server; a media server; and a network time server. The N playback devices are devices capable of presenting streamed encoded media content and each of these devices is connected to a LAN. The LAN is a conventional LAN and may include a local time server in accordance with some of these embodiments. One skilled in the art will recognize that although the playback devices are shown as connected to a LAN in this embodiments, other defined networks, such as but not limited to, peer to peer networks and Wide Area Networks (WAN) may be used without departing from this invention.

The local time server is a server that provides time information to devices connected to the LAN. In accordance with these embodiments, the time information is based upon time information received from a network time server as explained further below. The media server is a system that is providing the streamed content over the network to the first and second playback devices. The network time server is a time server that provides time information. In accordance with some embodiments, the time information is provided using NTP. Furthermore, the time information provides time information specified in terms of UTC.

In accordance with the timing diagram of FIG. 3, the local time server transmits a request 305 for time information to the network time server and receives the time information 310 from the time server in response. In accordance with some embodiments, this exchange is performed using NTP. However, other means for performing this exchange of messages and information may be used without departing from embodiments of this invention.

The local time server then uses the time information to generate time information for use by the playback devices connected to the LAN. The first playback device transmits a request 315 to the local time server for time information and receives time information 320 from the local time server in response to the request. Likewise, the second playback device transmits a request 325 to the local time server for information and receives time information 330 from the local time server in response to the request. The same process is performed for each of the remaining N playback devices including requests 335 and time information 340.

The N playback devices use the time information received to set the respective playback clocks in each device. As the time information is received over a LAN from the local server, there is less delay introduced into the time information. Thus, the playback clocks of the first and second playback devices will be more closely synchronized. Alternatively, the N playback devices may request and receive the time information from a common network time server if no local time server is available. However, one skilled in the art will also recognize that due to the network bandwidth and configuration of the networks connecting a network time server to the devices that some delay may be introduced between the time information provided to the various devices by the time server.

To start playback, the first device transmits a request 345 for streamed content to the media server. The media server transmits stream initiation information and begins transmitting a stream of encoded media for the desired content 350 to the first playback device. Similarly, the second device transmits a request 355 for the same streamed content to the media server. The media server transmits stream initiation information and begins transmitting a stream of encoded media for the desired content 360 to the second playback device. This same process is performed with each of the remaining N devices transmitting a request 365 for streamed content to the media server. The media server transmits stream initiation information and begins transmitting a stream of encoded media for the desired content 370 to each of the playback devices.

After the first playback device begins playing back the streamed content, the first playback device can generate presentation time information. For purposes of discussion, presentation information is information about the presentation time of the stream content on a particular playback device. In accordance with some embodiments, the presentation information may also include a playback speed such as, but not limited to, fast forward, fast forward ×2, rewind, rewind ×2, or pause. In accordance with some embodiments, the presentation time information may include a stream initiation time specified in UTC. The presentation time information is broadcast in a presentation time information message 375 to the other N playback devices connected to the network. In accordance with embodiments of this invention, the broadcast of presentation time information message 375 including the presentation time information may be performed using User Datagram Protocol (UDP) or any other type of multicast protocol.

The remaining N playback devices receive the presentation time information in the broadcast. The presentation time information and the local playback clock in each device are used to adjust the presentation time information in the frames from the stream of content. This synchronizes the playback of the content by the networked devices.

To maintain the synchronization, the first playback device broadcasts a presentation time update message 380 including updated presentation time information periodically to the remaining N playback devices. In accordance with some embodiments, the presentation time information includes presentation time information for a particular frame. In accordance with some further embodiments, the presentation information may also include a playback speed such as, but not limited to, fast forward, fast forward ×2, rewind, rewind ×2, or pause. The remaining devices use the updated presentation time information and the time information from the local play clock in the device to adjust the presentation time information of the frames in the streamed content. In accordance with some of these embodiments, the remaining N playback devices determine whether an update broadcast is received in a specified time period. If the update broadcast is not received in the specified period. A subsequent one of the N playback devices broadcasts an update 385 using presentation time information generated using the play clock in the device. The remaining N device that broadcasts the update may be decided in one of any number of ways. For example, the first playback device to detect the lack of an update broadcast may begin broadcasting the updates, there may be a designated hierarchy among the N devices for broadcasting the updates, or any other contention resolution algorithm for determining which device begins to broadcast the updates.

Figure 4:
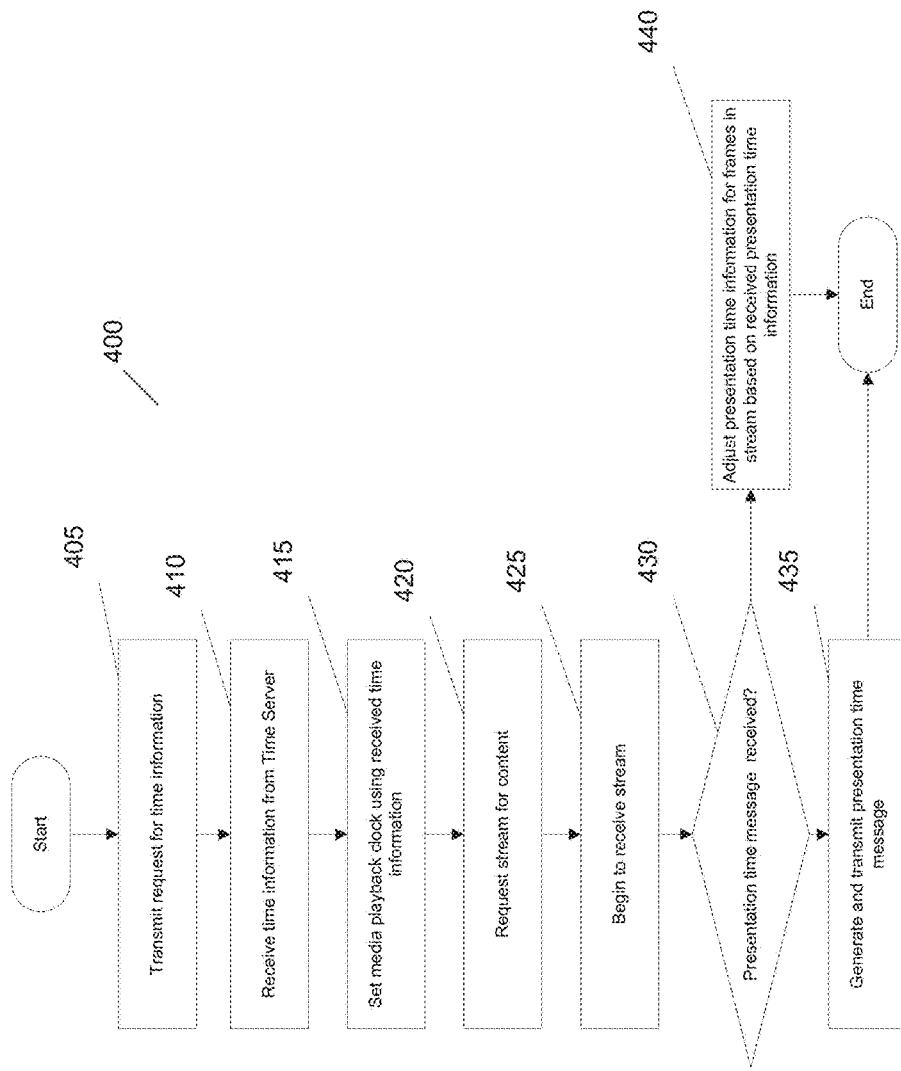
FIG. 4 illustrates a flow diagram of a process for the start of playback of streamed content performed by a playback device in accordance with embodiments of this invention.

A process performed by a playback device to provide synchronized playback in accordance with some embodiments of this invention is illustrated in FIG. 4. The process 400 includes transmitting a request for time information to a time provider (405). As discussed with reference to FIG. 3, the time provider may be, but is not limited to, a network time server and/or a local time server. The device receives time information from the time provider (410). The time information is preferably based upon the UTC. The time information is used by the playback device to set a media playback clock (415).

When the playback device requests streamed content (420), the playback device receives stream initiation information. In accordance with some embodiments, the stream initiation information may be in the top level index of the requested content or provided along with some other type of administrative information such as metadata or the like. The playback device then begins to receive the stream of media content (425). As the stream is received, the playback device determines whether a presentation time information message with presentation time information has been received (430). If a presentation time information message has been received, the presentation time information in the presentation time information message and the local time clock are used to adjust the presentation time information of each frame in the stream of content (440). The presentation time information may the Presentation Time Stamp (PTS) of a frame, PTS of a reference frame for a frame, or any other information that may be used to determine the time at which a frame may be presented. In accordance with some of these embodiments, the start time in the presentation time information given in UTC and the time of the playback clock are used to adjust the PTS of each frame. In particular, the difference between the start time in presentation time information and the playback clock may be used to adjust the PTS of each frame. Furthermore, the playback speed in the presentation time information may also be used to adjust the presentation times of the frames to maintain synchronization as the content is manually browsed on a playback device. The playback of the stream then commences and process 400 ends.

If the playback device determines that a presentation time information message has not been received, the playback device generates the presentation time information and broadcasts a presentation time information message over the local network to the remaining N devices (435). In accordance with some embodiments, the presentation time information may include a stream initiation time specified in UTC. In accordance with embodiments of this invention, the broadcast of presentation time information message including the presentation time information may be performed using User Datagram Protocol (UDP) or any other type of multicast protocol.

Figure 5:
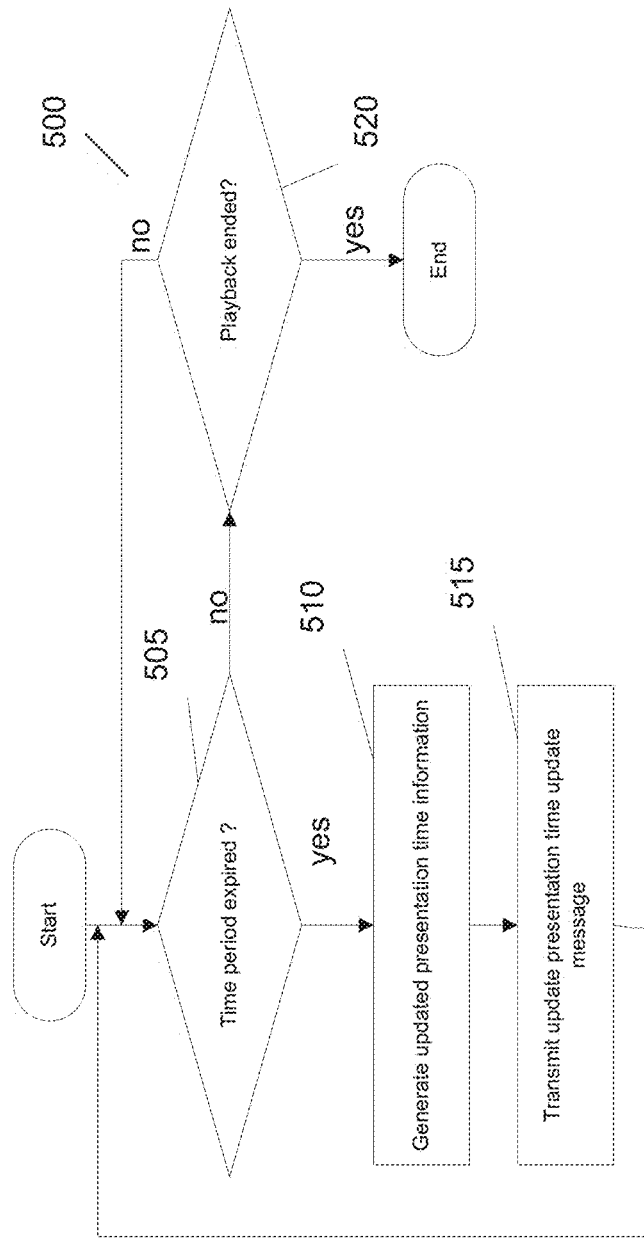
FIG. 5 illustrates a flow diagram of a process by first playback device during playback of the streamed content in accordance with embodiments of this invention.

A process for providing updates of the presentation time information from a playback device during playback in accordance with embodiments of this invention is illustrated in FIG. 5. Process 500 determines whether a specified time period has expired (505). The specified time period may be any time period and may be user defined or may be determined based upon the content being streamed. The specified period should expire frequently to allow the synchronization of the playback by the devices to be maintained.

If the playback period has not expired, the playback device monitors the time period (505) until playback has ended (520). If the time period has expired, the playback device generates updated presentation time information (510). The updated presentation time information may include a particular frame and presentation time information for the frame. In accordance with some embodiments, the presentation time information is specified in UTC. A playback update message including the updated presentation time information is then broadcast to the remaining N playback devices over the local network (515) and process 500 is repeated until playback ends.

Figure 6:
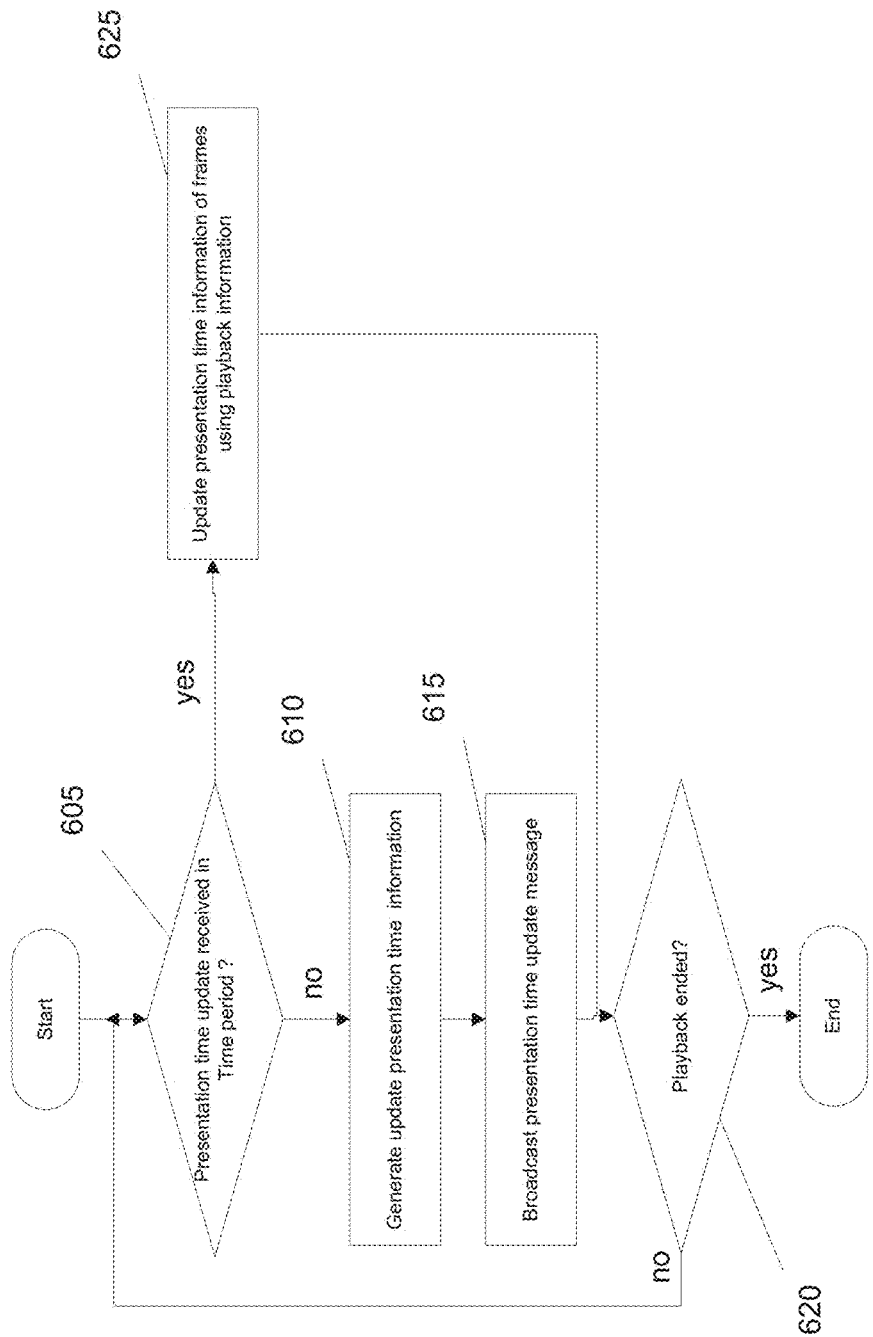
FIG. 6 illustrates a flow diagram of a process performed by other playback devices during the playback of the streamed content in accordance with embodiments of this invention.

A process performed by each of the remaining N playback devices that are receiving broadcasted playback update messages from a first playback device during playback to receive updated presentation time information in accordance with embodiments of this invention is illustrated in FIG. 6. In process 600, a playback device determines whether a presentation time playback update message is received within a specified time period (605). If the playback update message is received, the playback device uses the presentation time information and time information from the local playback clock to update the presentation time information for the frames of the streamed content (625). The updated presentation time information may include a reference a frame identified in the playback update message and the presentation time information of the reference frame. In some embodiments, the updated presentation time information may also include playback speed information. The presentation time for the referenced frame is modified accordingly. The remaining frames are then likewise adjusted based on the changes made to the referenced frame.

If a playback update message is not received within the specified period, the device generates updated presentation time information based upon the current presentation information for the frames maintained by the device (610). The updated presentation time information may include an identification of a particular frame and presentation time information for the identified frame. The presentation time information is preferably specified in UTC. The updated presentation time information is then broadcast to the remaining playback devices over the local network (615) and process is repeated until playback ends (620).

The above is description of embodiments of systems and methods in accordance with the present invention. It is foreseen that others skilled in the art will design alternative systems that infringe on this invention as set forth in the following claims either literally or through the Doctrine of Equivalents.

What is claimed is:

1. A method for playback of encoded media performed by a first playback device connected to a defined network including a plurality of playback devices comprising:
   transmitting a request for time information from a first playback device to a network time provider;
   receiving the time information from the network time provider in the first playback device;
   setting a playback clock in the first playback device using the received time information;
   receiving, by the first playback device, presentation time information for a stream of encoded media from another playback device of a plurality of playback devices over a defined network wherein the presentation time information includes a stream start time;
   receiving, by the first playback device, a stream of the encoded media in the first playback device and presentation time information for at least some of the plurality of frames, wherein the stream includes a plurality of frames of the encoded content;
   determining, using the first playback device, whether the presentation time information has been received from another one of the plurality of playback devices in response to beginning the reception of the stream of encoded media;
   generating presentation time information in the first playback device in response to a determination that the presentation time information has not been received from the another one of the plurality of playback devices;
   broadcasting the presentation time information from the first playback device to other ones of the plurality of playback devices connected to the defined network over the defined network;
   adjusting the presentation time information of at least one of the plurality of frames of the stream in the first playback device based upon one of: the presentation time information generated by the playback device and the presentation time information received from the another one of the plurality of playback devices; and
   commencing playback, by the first playback device, of the stream of encoded media based on the adjusted presentation time information of at least one of the plurality of frames.

2. The method of claim 1 further comprising, using the first playback device:
   determining that a specified time period has expired;
   generating updated presentation time information in response to the time period expiring; and
   broadcasting the updated presentation time information to the other ones of the plurality of playback devices connected to the defined network over the defined network.

3. The method of claim 1 further comprising, using the first playback device:
   receiving updated presentation time information from another playback device of the plurality of playback devices over the defined network; and
   adjusting the presentation time information of each of the plurality of frames of the stream in the first playback device based upon the playback information.

4. The method of claim 1 wherein the time information is provided in Coordinated Universal Time.

5. The method of claim 1 wherein the start time is provided in Coordinated Universal Time.

6. The method of claim 1 wherein the network time provider is a Network Time Protocol Server and the transmitting of the request and receiving of the time information are performed using Network Time Protocol.

7. The method of claim 1 wherein the network time provider is a local time server for the defined network.

8. The method of claim 1 wherein the presentation time information includes presentation time information for a particular frame and a playback speed.

9. The method of claim 1 wherein the defined network is a local area network.

10. The method of claim 3 further comprising, using the first playback device:
   determining whether the updated presentation time information is received within a specified time period;
   generating updated presentation time information in response to a determination that the updated presentation time information was not received in the specified time period; and
   broadcasting the updated presentation time information to the other ones of the plurality of playback devices connected to the defined network over the defined network.

11. The method of claim 7 further comprising:
   transmitting a request for time information from the network time provider to a Network Time Protocol server, where the network time provider is a local time server;
   receiving the time information from the Network Time Protocol server in the local time server;
   receiving the request for time information from the first playback device in the local time server;
   generating, by the local timer server, the time information for the first playback device from the timing information received from the Network Time Protocol server; and
   transmitting the time information from the local time server to the first playback device.

12. The method of claim 10 wherein the updated presentation time information includes presentation time information for a frame in the stream and a current playback speed.

13. A playback device for providing playback of encoded media based on a provided start time comprising: memory; and
   a processor configured via a client application stored in the memory to:
      transmit a request for time information to a network time provider;
      receive the time information from the network time provider;
      set a playback clock in the playback device using the received time information;
      receive presentation time information for a stream of encoded media from another playback device of a plurality of playback devices over a defined network wherein the presentation time information includes a stream start time;
      receive a stream of the encoded media in the playback device and presentation time information for at least some of the plurality of frames, wherein the stream includes a plurality of frames of the encoded content;
      determine whether the presentation time information has been received from another one of the plurality of playback devices in response to beginning the reception of the stream of encoded media;
      generate presentation time information in response to a determination that the presentation time information has not been received from the another one of the plurality of playback devices;
      broadcast the presentation time information to other ones of the plurality of playback devices connected to the defined network over the defined network;
      adjust the presentation time information of at least one of the plurality of frames of the stream in the playback device based upon one of: the presentation time information generated by the playback device and the presentation time information received from the another one of the plurality of playback devices; and
      commence playback of the stream of encoded media based on the adjusted presentation time information of at least one of the plurality of frames.

14. The playback device of claim 13 wherein the client application further configures the processor to:
   determine that a specified time period has expired;
   generate updated presentation time information in response to the time period expiring; and
   broadcast the updated presentation time information to the other ones of the plurality of playback devices connected to the defined network over the defined network.

15. The playback device of claim 13 wherein
   the client application further configures the processor to:
   receive updated presentation time information from another one of the plurality of playback devices over the defined network; and
   adjust the presentation time information of each of the plurality of frames of the stream in the playback device based upon the presentation time information.

16. The playback device of claim 13 wherein the presentation time information includes a playback speed.

17. The playback device of claim 13 wherein the defined network is a local area network.

18. The playback device of claim 13 wherein the time information is provided in Coordinated Universal Time.

19. The playback device of claim 13 wherein the start time is provided in Coordinated Universal Time.

20. The playback of claim 13 wherein the network time provider is a Network Time Protocol Server and the transmitting of the request and receiving of the time information are performed using Network Time Protocol.

21. The playback device of claim 15 herein the client application further configures the processor to:
   determine whether the updated presentation time information is received within a specified time period;
   generate updated presentation time information in response to a determination that the updated presentation time information was not received in the specified time period; and
   broadcast the updated presentation time information to the other playback devices connected to the defined network over the defined network.

22. The playback device of claim 15 wherein the updated presentation time information includes presentation time information for a particular one of the plurality of playback frames in the stream of encoded media and a playback speed.

* * * * *